United States Patent
Omi

(10) Patent No.: US 6,252,704 B1
(45) Date of Patent: Jun. 26, 2001

(54) MICROSCOPE

(75) Inventor: Eiichi Omi, Akeno-machi (JP)

(73) Assignee: Lunax Company Limited, Akeno-machi (JP)

( * ) Notice: Subject to any disclaimer, the term of this patent is extended or adjusted under 35 U.S.C. 154(b) by 0 days.

(21) Appl. No.: 09/487,350

(22) Filed: Jan. 19, 2000

(30) Foreign Application Priority Data

Jan. 19, 1999 (JP) .................................................. 11-010302
Feb. 26, 1999 (JP) .................................................. 11-050792

(51) Int. Cl.[7] ............................. G02B 21/26; G02B 21/00
(52) U.S. Cl. ......................... 359/391; 359/368; 359/379; 359/383
(58) Field of Search ...................................... 359/362–363, 359/368–390; 250/308–312

(56) References Cited

U.S. PATENT DOCUMENTS

| | | | | |
|---|---|---|---|---|
| 3,259,012 | * | 7/1966 | Locquin | 359/383 |
| 5,315,344 | * | 5/1994 | Clark et al. | 359/363 |
| 5,682,264 | | 10/1997 | Cleveland et al. | 359/510 |
| 5,835,265 | * | 11/1998 | Mammone | 359/363 |
| 5,853,363 | | 12/1998 | Vought | 600/121 |

FOREIGN PATENT DOCUMENTS 39 18 990  12/1990  (DE) .
2 532 065  2/1984  (FR) .

* cited by examiner

*Primary Examiner*—Thong Nguyen
(74) *Attorney, Agent, or Firm*—Jacobson, Price, Holman & Stern, PLLC

(57) ABSTRACT

A microscope including a support section for supporting a viewing section and an objective lens section and slidably supporting a stage section and a lighting section. The objective lens section includes a plurality of objective lenses having different magnifying factors and arranged linearly in a direction perpendicular to the support section and the objective lenses are contained in a downwardly directed housing while the stage section is contained in an upwardly directed housing so that a hermetically sealed housing can be formed of the downwardly directed housing and the upwardly directed housing by driving the stage section to slide.

7 Claims, 5 Drawing Sheets

MICROSCOPE

BACKGROUND OF THE INVENTION

1. Field of the Invention

This invention relates to a microscope and, more particularly, it relates to a microscope specifically designed to hermetically seal and protect the objective lens and the specimen when the microscope is not in use but in storage.

2. Prior Art

In conventional microscopes, a plurality of objective lenses having different respective magnifying factors are normally fitted to a rotary member normally referred to as an objective turret or revolver so that a desired magnifying factor may be selected by turning the objective turret, while the stage of the microscope, which is a stationary flat member, is provided with a sliding holder for holding a specimen prepared and carried on a small glass plate for microscope observation.

In conventional microscopes of the above described type comprising a plurality of objective lenses, one of which is selected and placed on the optical axis of the optical system of the microscope, the stage of the microscope, which is a stationary flat member, is provided with a sliding holder for holding a specimen or a petri dish containing a liquid specimen or liquid by turn containing a specimen.

Conventional microscopes of the above described type are inevitably bulky because a plurality of objective lenses are fitted to an objective turret and comprise a large number of parts. Additionally, the operation of turning the objective turret is not an easy one for children who can inadvertently move the microscope that has been placed in position and/or the specimen that has been secured to the stage.

Still additionally, it is rather difficult to optically regulate the microscope if it comprises a plurality of objective lenses fitted to an objective turret.

Meanwhile, when the microscope is not in use, the objective lenses and the stage are exposed to the atmosphere so that fine pieces of dust can easily be collected there.

Additionally, they can be adversely affected by moisture in the atmosphere. On the other hand, a large container will be required for storing the objective lenses and the stage in a hermetically sealed state and hence the use of such a large container is not feasible.

The stage is designed simply for receiving a specimen on a flat area thereof. A specimen containing plankton is placed in a petri dish, which is by turn placed on the stage for microscopic observation. However, petri dishes are rather bulky and apt to be broken so that it is difficult to safely store them.

With the focussing mechanism of known microscopes, the specimen is brought into focus by regulating the distance between the objective lens system and the stage. For example, the object lens system is rigidly secured to the microscope main body while the stage is held by the microscope main body and made movable along the main optical axis of the optical system. However, objective lenses having different magnifying factors require different moving distances between the optical system and the specimen on the stage. Therefore, when one of the objective lenses is selected and manipulated to bring the specimen into focus, some or the remaining objective lenses may collide with the specimen or the stage. Or, there may be cases where the specimen on the stage would not come into focus at all.

In view of the above identified problems of known microscopes, it is therefore an object of the present invention to provide a compact microscope that comprises a reduced number of parts and does not use an objective turret, while it is adapted to select a desired magnifying factor with ease and free from the risk of making difficult the effort of bringing the specimen into focus.

Another object of the present invention is to provide a microscope that can be easily regulated for focussing at the time of assembly and also at the time of using it for microscope observation.

Still another object of the present invention is to provide a microscope whose objective lenses and stage are protected against exposure to the atmosphere when it is not in use and also prevented from collecting fine pieces of dust and being adversely affected by moisture in the atmosphere.

Still another object of the present invention is to provide a microscope with which a specimen of liquid that contains plankton can be placed on the stage for microscopic observation without using a petri dish.

A further object of the present invention is to provide a microscope with which objective lenses of different magnifying factors can be efficiently and conveniently used without the risk of colliding with the stage and that of being unable to bring the specimen into focus to a certain extent.

SUMMARY OF THE INVENTION

In an aspect of the invention, the above objects and other objects of the invention are achieved by providing a microscope comprising a support section adapted to support a viewing section and an objective lens section and slidably support a stage section and a lighting section, characterized in that said objective lens section includes a plurality of objective lenses having different magnifying factors and arranged linearly in a direction perpendicular to said support section and said objective lenses are contained in a downwardly directed housing while said stage section is contained in an upwardly directed housing so that a hermetically sealed housing can be formed of said downwardly directed housing and said upwardly directed housing by driving said stage section to slide.

In another aspect of the invention, there is also provided a microscope comprising a plurality of objective lenses adapted to be selectively placed on the optical axis of the optical system of the microscope and a stage for carrying a specimen, characterized in that said stage includes a stationary stage section having sliding guide grooves running perpendicular relative to the main optical axis of the optical system and a sliding stage plate section having sliding guide ridges, said sliding stage plate section having a plurality of specimen receivers with specimen receiving planes disposed at different positions relative to the main optical axis.

In still another aspect of the invention, there is provided a microscope stage, characterized by comprising a stationary stage section having sliding guide grooves running perpendicular relative to the main optical axis of the optical system and a sliding stage plate section having sliding guide ridges, said sliding stage plate section having a plurality of specimen receivers with specimen receiving planes disposed at different positions relative to the main optical axis.

Preferably, said stage section has recesses with transparent members arranged at the bottom thereof. Preferably, said stage section is interchangeable. Preferably, said viewing section is of the projection type. Preferably said viewing section has two screens including a front screen and a rear screen. Preferably, said viewing section includes an inclined reflection mirror adapted to rotate around the optical axis of said objective lenses and project an image of the specimen onto one of said screens.

DETAILED DESCRIPTION OF THE PREFERRED EMBODIMENTS

Figure 1:
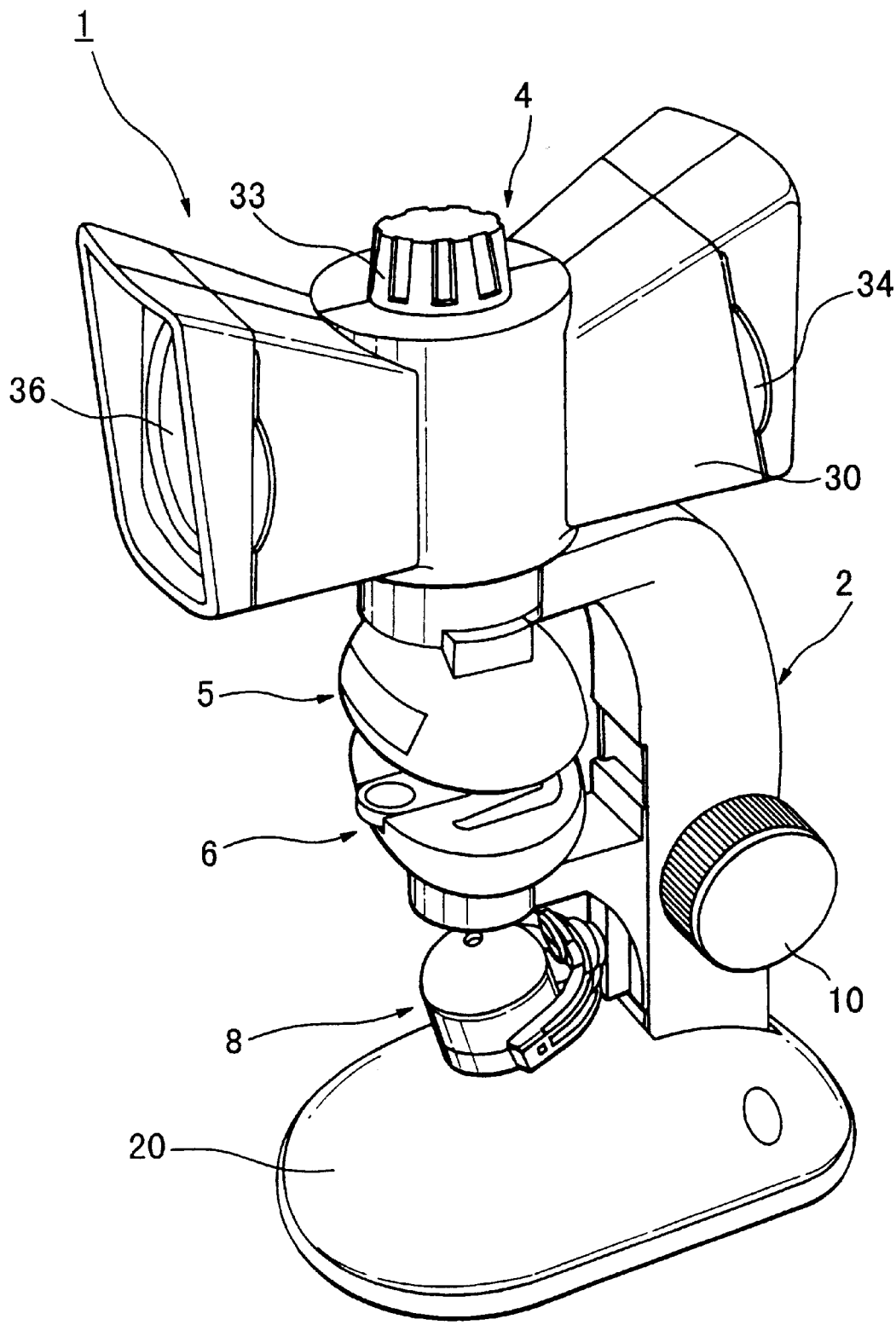
FIG. 1 is a perspective view of a microscope of an embodiment of the present invention.
Figure 2:
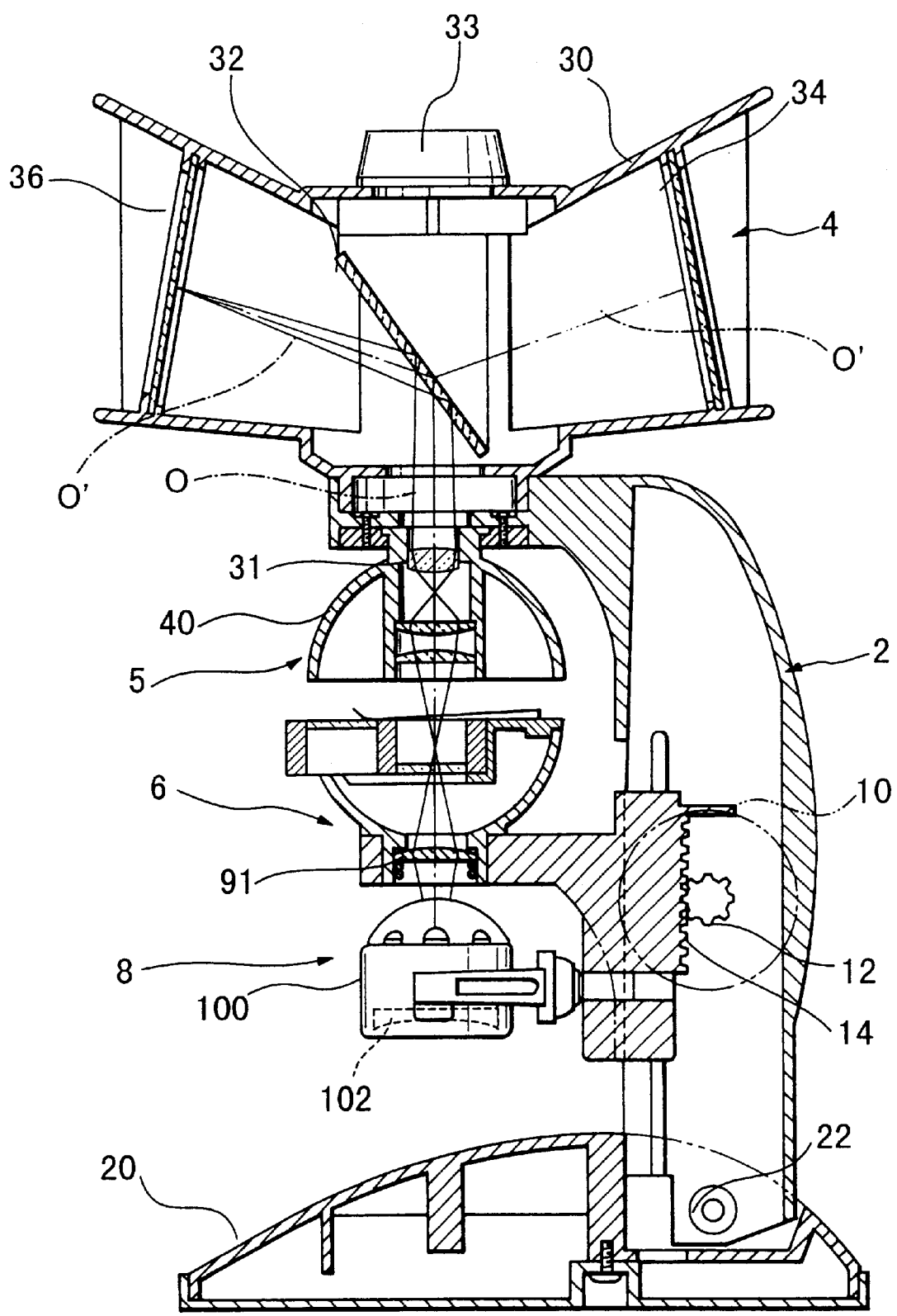
FIG. 2 is a vertical cross section of the microscope.
Figure 3:
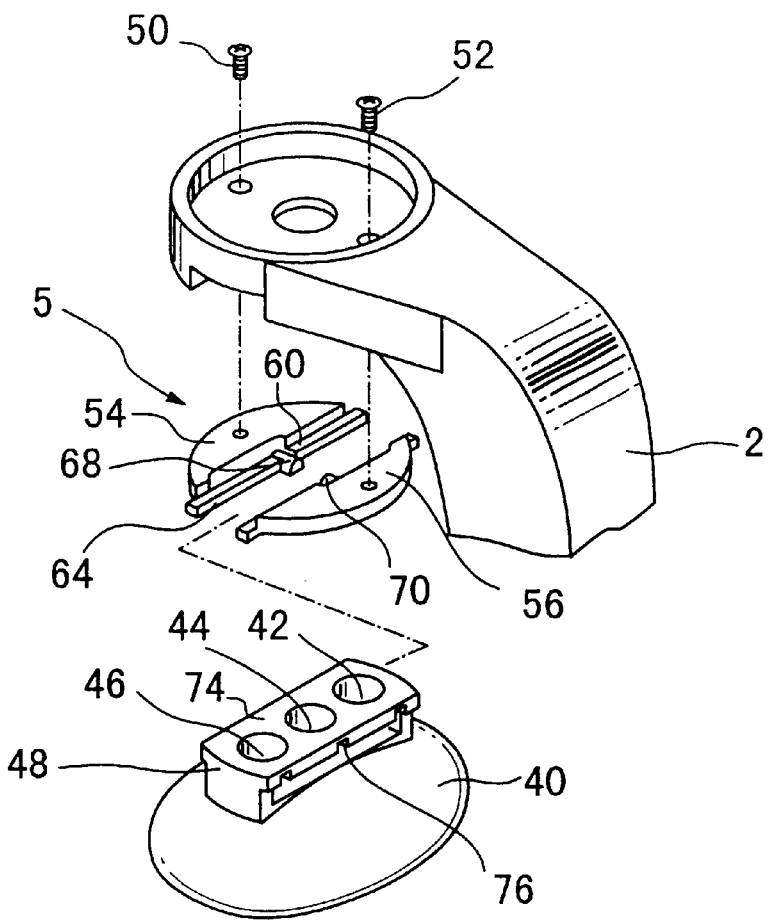
FIG. 3 is a disassembled perspective view of an objective lens section of the microscope.
Figure 4:
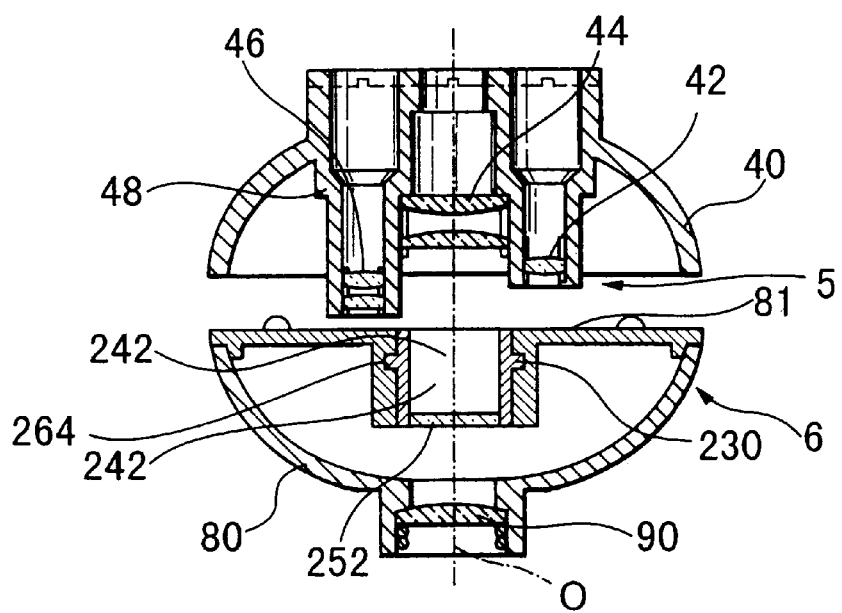
FIG. 4 is a vertical cross section of the objective lens section of the microscope.

Now, the present invention will be described in greater detail by referring to the accompanying drawings that illustrate preferred embodiments of the invention. Referring firstly to FIGS. 1 and 2, microscope 1 comprises a support member 2 for supporting a viewing section 4 and an objective lens section 5. Additionally, the support member 2 slidably supports a stage section 6 for carrying a specimen and a lighting section 8.

As seen from FIG. 2, the support section 2 is provided at a lateral side thereof with a focussing knob 10. As the knob 10 is rotated, both the stage section 6 and the lighting section 8 are moved up and down by way of a rack 14 held in engagement with a pinion 12, which pinion 12 is integral with the focussing knob 10. The support section 2 is swingably fitted to a base 20 by means of a pin 22 so that the support section 2 may be held to an upright position or an inclined position.

While the viewing section 4 shown in FIGS. 1 and 2 is of the projection type, it is interchangeable and may be replaced by one or two eye pieces (not shown). As seen from FIG. 2, the projection type viewing section 4 comprises a housing 30 that contains therein an inclined mirror 32 and which is arranged on the optical axis O of projection lens 31. The mirror 32 can be rotated by means of a viewing control knob 33. An observer screen 34 and an assistant screen 36 are made of frosted glass and arranged respectively on the two reflected optical axes O' of the inclined mirror 32.

The objective lens section 5 comprises an objective lens housing 40 having a semispherical profile and containing the other components of the objective lens section 5 including an objective lens 42 with a magnifying factor of 15, an objective lens 44 with a magnifying factor of 10 and an objective lens 46 with a magnifying factor of 40, which are housed in and supported by a lens holder 48 that is sidable in a direction perpendicular to the optical axis O. The objective lens section 5 is guided by a pair of guide rails 54, 56 to move in a direction perpendicular to the optical axis O so that the lens having a desired magnifying factor may be selected for use by moving the lens holder 48 to slide on the guide rails 54, 56, which are secured to the top of the support section 2 by means of screws 50, 52. The guide rails 54, 56 respectively have rail ridges 60, 60, resilient arms 64, 64 and click projections 68, 70 as integral parts thereof. The click projections 68, 70 click-fit with respective clock notches 74, 76 of the lens holder 48 so that selected one of the objective lenses 42, 44, 46 can be held on the optical axis O with little holding effort.

The stage section 6 comprises a substantially semispherical stage housing 80 for containing a condenser lens 90 to condense a light beam from lighting section 8 to a specimen located at surface 81 as well as the other components of the stage section 6. The part of the stage section 6 that contains a specimen is interchangeable. Referring to FIGS. 5 through 8, it has a flat surface 210, which is a stationary stage member, and a slit 220 extending to the side opposite to the support section 2 and adapted to removably receive a specimen holder 222 like a drawer. The specimen holder 222 is provided at upper positions on the lateral walls thereof with respective horizontal sliding guide ridges 230 extending in parallel with the top and bottom surfaces. The specimen holder 222 is also provided at the oppositely disposed rounded ends thereof with respective circular through holes 240, 242 that are concentric with the respective rounded ends. A circular piece of polished plane glass 250 is water-tightly fitted to the top of the circular through hole 240, while another circular piece of polished plane glass 252 is water-tightly fitted to the bottom of the circular through hole 242. These two circular pieces of plane polished glass operate as so many stages for carrying respective specimens. The specimen holder 222 is additionally provided with a pair of semicircular recesses 260, 262 that are cut from the side of the circular piece of polished plane glass 252 at positions between the two circular through holes 240, 242 and open at the respective lateral sides that are parallel to the line connecting the centers of the two circular through holes 240, 242 as most clearly seen from FIG. 7 showing the specimen holder turned upside down relative to FIG. 5.

The slit 220 is provided on the lateral walls thereof with sliding guide grooves 264 for receiving the respective sliding guide ridges 230.

Figure 5:
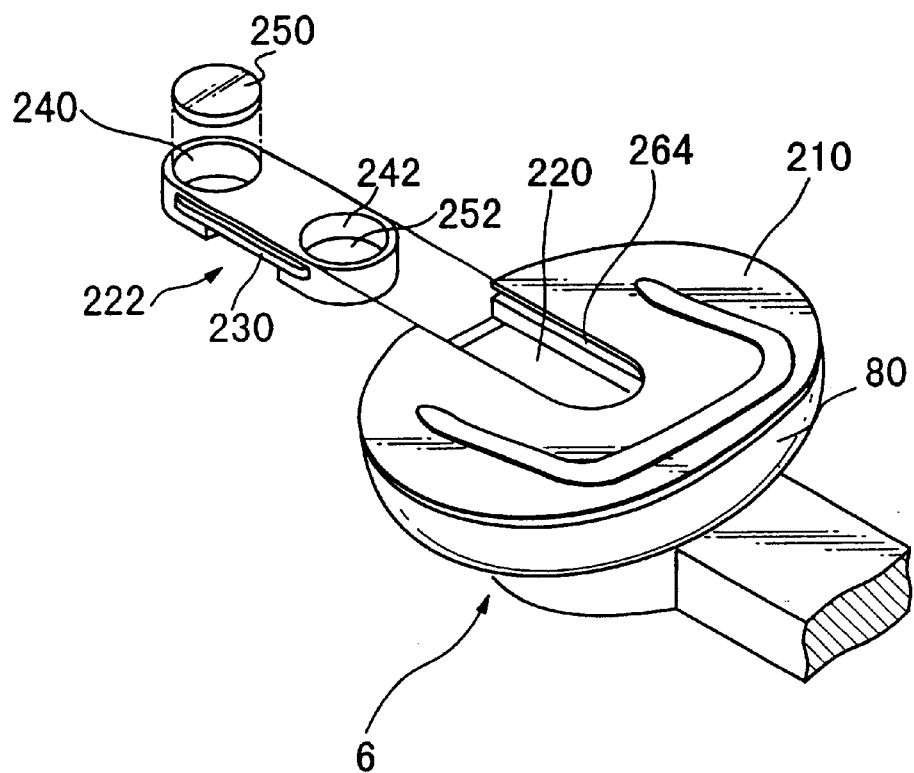
FIG. 5 is a disassembled perspective view of a stage section of the microscope.

With the embodiment having the above described configuration, as the specimen holder 222 is inserted into the slit 220 with the posture as shown in FIG. 5, the flat surface 210 becomes flush with the upper surface of the specimen holder 222 so that the circular piece of polished glass 252 operating as bottom of the circular through hole 242 for receiving a liquid specimen is located significantly below the flat surface 210. Then, the specimen may not be in focus if the objective lenses 42, 44, 46 are brought down to the lowest position by means of the focussing knob 10.

Figure 6:
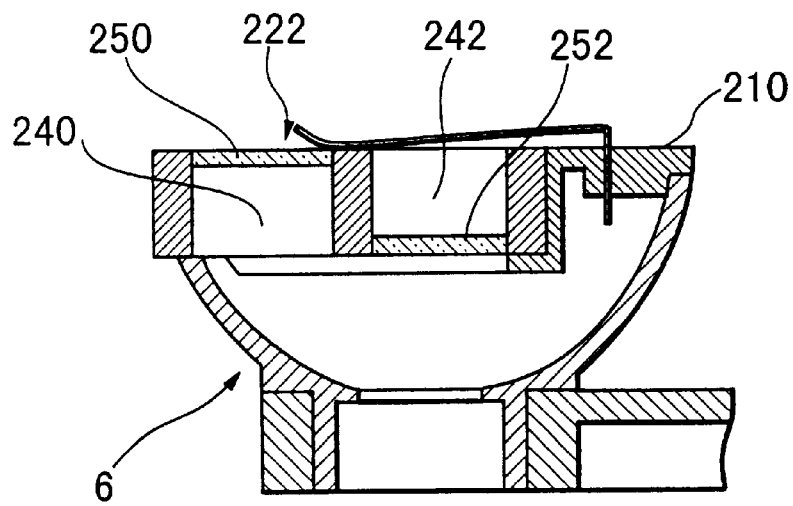
FIG. 6 is a vertical cross section of the stage section of the microscope.
Figure 7:
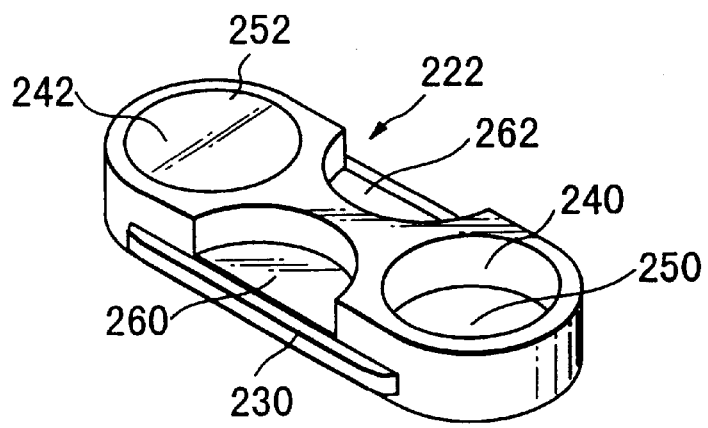
FIG. 7 is a perspective view of the specimen holder of the microscope.

If the specimen holder 222 of FIG. 5 is turned upside down to make it take a posture as shown in FIG. 7 and inserted into the slit 220 to make the circular piece of polished plane glass 252 flush with the flat surface 210, the circular piece of polished glass 250 operating to block the circular through hole 240 for receiving a specimen is located significantly above the position of FIG. 6. Then, the specimen in the specimen holder 222 that is not in focus with the posture of FIG. 6 may now be in focus.

By using a stage section 6 having a configuration as described above, it is now possible to observe water fleas, plankton and brine shrimps that are alive and moving through the microscope. Similarly, small creatures such as ants, mosquitoes, ant cows and mysis can be observed through the microscope while they are alive and moving. Additionally, small plants such as diatoms, pollen, spores of ferns, seeds, mineral sand, iron sand, sugar and salt can be effectively and clearly observed through the microscope.

Reflection lighting or lighting using a lamp may feasibly be used for the lighting section 8. Light may be emitted upwardly from a lamp (not shown) contained in a lamp housing 100 in a manner as shown in FIG. 2 to irradiate the stage section 6. Reflection mirror 102 may be used to reflect ambient light toward the stage section 6 when it is turned by about 180 degrees from the posture shown in FIG. 2.

After using a microscope according to the invention and having the above described configuration, the objective lens section 5 is positionally so regulated as to make the central objective lens 44 to be located on the optical axis O and the specimen holder 222 is inserted into the slit 220 to make it take a posture as shown in FIG. 5 or FIG. 7. Subsequently, the focussing knob 10 is rotated to raise the stage section 6 and the lighting section 8 to put the objective lens housing 40 and the stage housing 80 together and form a ball. Due to the shape and dimensions of the two housings 40, 80, the two housings are hermetically sealed to protect the objective lenses 42, 44, 46, the stage section 6 and other related components when the two housings are moved into contact with each other.

Figure 8:
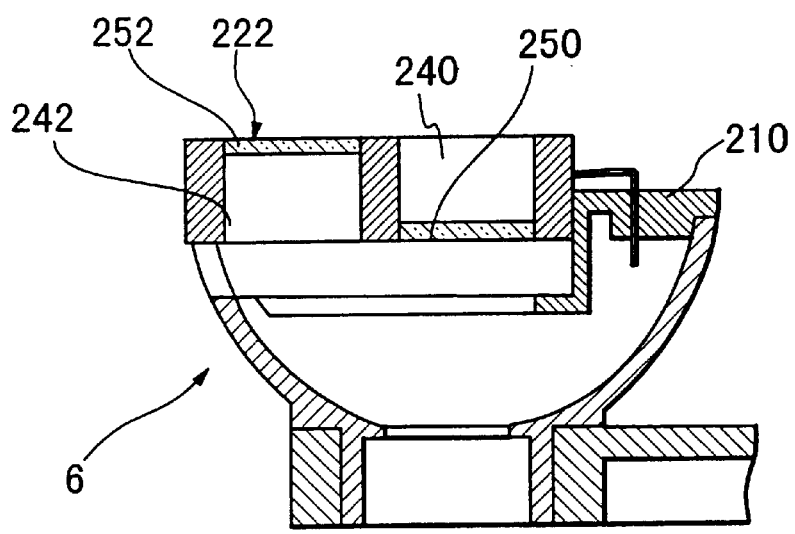
FIG. 8 is a vertical cross section of the specimen holder which holds the specimen holder shown in FIG. 7.

While a plurality of objective lenses with different magnifying factors are fitted to a lens holder that is reciprocally movable in a direction perpendicular to the main optical axis of the optical system in the above described embodiment of microscope according to the invention, a plurality of objective lenses with different magnifying factors may be fitted to a turret or a revolver in another embodiment. When the objective lenses 42, 44, 46 are moved down to the lowest limit in a posture as shown in FIG. 8, the objective lenses that are not in use can be prevented from colliding with the specimen holder 222 because of the provision of cylindrical recesses 260, 262 on the part of the specimen holder 222.

Figure 9:
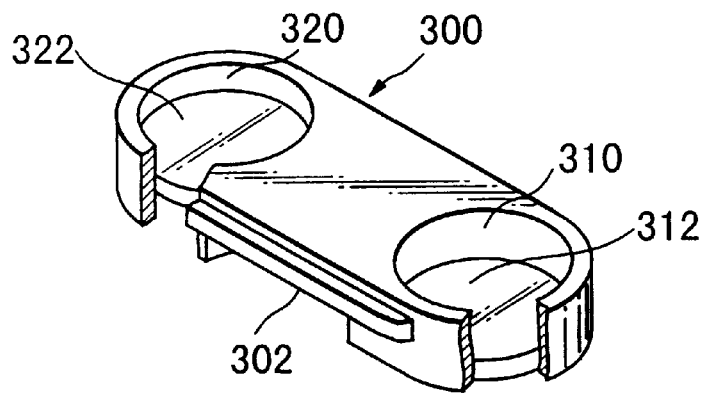
FIG. 9 is a partially sectioned, perspective view of a specimen holder of another embodiment of the present invention.

FIG. 9 shows another possible configuration of specimen holder that can be used for the purpose of the invention. The specimen holder 300 of FIG. 9 also has rounded opposite ends and is adapted to be received into the stage section 6 like a drawer. It is also provided at upper positions on the lateral walls thereof with respective horizontal sliding guide ridges 302 extending in parallel with the top and bottom surfaces. The specimen holder 300 is further provided at the oppositely disposed rounded ends thereof with respective circular through holes 310, 320 that are concentric with the respective rounded ends. A circular piece of polished plane glass 312 is water-tightly fitted to the bottom of the circular through hole 310 and another circular piece of polished plane glass 322 is also water-tightly fitted to the bottom of the circular through hole 320. These two circular pieces of plane polished glass operate as so many stages for carrying respective specimens. The specimen holder 300 can shift the level of the stage to be used when it is turned around and inserted into the stage section 6 without being turned upside down.

The specimen holder may alternatively be prepared in such a way that the transparent members for blocking the circular threshold holes are made of acrylic or, still alternatively, the entire specimen holder may be made of acrylic.

As described above, with a microscope according to the invention, the objective lenses with different magnifying factors can be effectively utilized without causing them collide with the specimen holding stage and the microscope can prevent the specimen from going out of focus to a considerable extent.

What is claimed is:

1. A microscope comprising a support section supporting a viewing section, an objective lens section, a stage section and a lighting section, said objective lens section including a plurality of objective lenses having different magnifying factors arranged linearly in a direction perpendicular to said support section and said objective lenses being contained in a downwardly directed housing, while said stage section is contained in an upwardly directed housing, and at least one said housings being movable on said support section so that said objective lens section and said stage section are located in predetermined position in contact with each other so that a hermetically sealed housing can be formed of said downwardly directed housing and said upwardly directed housing.

2. A microscope according to claim 1, wherein said stage section has recesses with transparent members arranged at a bottom thereof.

3. A microscope according to claim 1, wherein said stage section is interchangeable.

4. A microscope according to claim 1, wherein said viewing section is of the projection type.

5. A microscope according to claim 1, wherein said viewing section has two screens including a front screen and a rear screen.

6. A microscope according to claim 5, wherein said viewing section includes an inclined reflection mirror adapted to rotate around an optical axis of said objective lenses and project an image onto one of said screens.

7. A microscope according to claim 1, wherein said stage section includes a stationary stage section having sliding guide grooves running perpendicular relative to a main optical axis of an optical system and a sliding stage plate section having sliding guide ridges, said sliding stage plate section having a plurality of specimen receivers with specimen receiving planes disposed at different positions relative to the main optical axis.

\* \* \* \* \*